United States Patent [19]
Li

[11] Patent Number: 5,581,136
[45] Date of Patent: Dec. 3, 1996

[54] AUXILIARY MAGNETIC MOTOR (AMM)

[76] Inventor: I-Ho Li, 5F 21, Lane 16 Sec. 2 Chung Shan N. Road, Taipei, Taiwan

[21] Appl. No.: 359,749

[22] Filed: Dec. 20, 1994

[51] Int. Cl.$^6$ .............................. H02K 7/14; B62M 7/12
[52] U.S. Cl. ...................... 310/67 R; 180/65.5; 180/220
[58] Field of Search ................................. 310/67 R, 83; 180/65.5, 65.6, 220

[56] References Cited

U.S. PATENT DOCUMENTS

| | | | |
|---|---|---|---|
| 3,884,317 | 5/1975 | Kinzel | 310/156 |
| 3,921,741 | 11/1975 | Garfinkle et al. | 180/220 |
| 4,049,986 | 8/1977 | Kreuz | 310/68 B |
| 5,087,229 | 2/1992 | Hewko et al. | 180/65.5 |
| 5,272,938 | 12/1993 | Hsu et al. | 310/83 |
| 5,370,200 | 12/1994 | Takata | 180/220 |
| 5,450,915 | 9/1995 | Li | 180/65.5 |

FOREIGN PATENT DOCUMENTS

| | | | |
|---|---|---|---|
| 500087 | 1/1976 | U.S.S.R. | 180/65.5 |
| 92/07728 | 5/1992 | WIPO | 180/65.5 |

*Primary Examiner*—Clayton E. LaBalle
*Attorney, Agent, or Firm*—Morton J. Rosenberg; David I. Klein

[57] ABSTRACT

An auxiliary magnetic motor (AMM) comprises a fixed ring formed of a multi-layer flat silicon steel plate with a plurality of coils formed thereon, the fixed ring being fixedly supported within a motor case. The AMM also comprises at appropriate positions on the fixed ring at least three Hall effect IC sensors for sensing and producing a switching sequence signal for the fixed ring. The motor case center connects to one end of the axle of the bicycle wheel to be driven. The AMM further comprises a flat rotating plate having an outer ring portion having formed thereon a plurality of magnetic elements. Matching speed sensor elements are appropriately located respectively on the motor case and the cover case to sense and feedback the rotational speed of the wheel to a programmable control circuit, so as to actuate a motor control circuit which provides a three phase signal to the fixed ring to magnetically actuate the rotation of the rotating plate, thereby driving the wheel through various linkages and a gear mechanism.

7 Claims, 5 Drawing Sheets

AUXILIARY MAGNETIC MOTOR (AMM)

BACKGROUND OF THE INVENTION

1. Field of the Invention

The present invention is directed to an auxiliary motor for vehicles such as bicycles. More specifically, the present invention is directed to an auxiliary magnetic motor power structure for such vehicles that incorporates three-phase magnetic coils on a fixed ring coupled to an internal running axle in a brushless switching Auxiliary Magnetic Motor (AMM) propulsion system. The system incorporates a plurality of Hall effect ICs that operate to feed back a signal for optimal motor control.

2. Description of the Prior Art

Bicycles and other manually powered vehicles remain a prevalent mode of transportation. In recent years, widespread concerns regarding air pollution and other environmental protection issues have further encouraged the use of such vehicles. One obvious drawback of these vehicles as reliable modes of transportation, however, is the limited propulsion that an operator may generate on them. For trips of any significant length, they are practically useless for most people. Thus, bicycles and other such vehicles are limited to local travel uses.

Motorized bicycles are known in the art, but typically, the control systems, the motor systems, the control circuitry design, and the motor gear boxes associated with such prior art bicycles are characterized by numerous problems. The problems encountered are as follows:

1. Control System: The conventional design architecture is to locate the motor directly on the axle of the vehicle's running wheel. To start the motor, a control switch coupled to a battery and circuitry of an electronic motor is actuated. Open loop operation results wherein once the switch is actuated, full power transmits to the given drive wheel, resulting in vehicle motion which is, initially at least, difficult to control. If the operator is not extremely careful, catastrophic collisions could easily result. Even aside from the fixed current, fixed voltage, fixed speedometer, and fixed torque outputs in these bicycles, the motor itself may not be automatically controlled precisely enough to actuate only where sufficiently necessitated by the bicycle speed being maintained, and the electric power source (battery) may be prematurely exhausted as a consequence. The resulting power deficiency would further degrade vehicle performance.

2. Motor System: In conventional motorized bicycles, the electric motor is of the brush type which in most cases is not only heavy, but is also very bulky. Their incorporation in a bicycle yields a far from delicate and sleek motor vehicle. Few, if any, such prior art motorized bicycles have met with much success in commercial markets.

3. Circuitry Design: In conventional motorized bicycles, conductive lines pass directly through various points in the case of the motor, separately connecting to power supply and starter. The main circuitry is positioned quite far from the center of the drive wheel axle. It is often difficult to design a central bearing seat for the circuitry that is not bulky and awkward, and avoidance of circuitry damage becomes difficult.

4. Motor Gear Box: Conventional motorized bicycles incorporate motors that occupy much space and are quite difficult to service. In addition, the actuating and changing of motor speed is controlled through the traditional coupling of brush and distributed electric plate mechanisms. The motor design itself is, therefore, relatively complicated. For instance, the number and routing of coils must be well calculated and precisely controlled relative to their contact points. Also, after a period of use, electric brush damages will invariably occur from repeated mechanical contacts, and the motor's operational life will be shortened. Thus, this design is not very practical.

These four practical problems of conventional motorized bicycles pose significant obstacles for manufacturers, which at the present time, have not been adequately addressed.

SUMMARY OF THE INVENTION

In view of these shortcomings, the present invention provides an improved motor system for incorporation into manually powered vehicles such as bicycles. The motor structure includes a rotating plate which magnetically couples with the fixed magnetic plate of silicon steel composition. The motor uses this rotating plate to drive the axial shaft of a running wheel. The rotational drive of the running wheel is then transferred by a gear box to the vehicle wheel to be driven. Electrical connections necessary to actuate this motor operation are routed through one side of the wheel axis to form a delicate and sleek structure suitable for motorized bicycle applications which does not hinder operation of the motorized vehicle.

An object of the present invention is to provide an AMM system which incorporates fixed magnetic coils formed by three arm star type (Y type) conductors. Within the motor assembly, the relative electric phase angles necessary for proper motor actuation are set using three Hall effect ICs (integrated circuitry) to detect the magnetic power switching sequence generated. Both the Hall IC signals and the fixed magnetic coils are, accordingly, connected to the motor control circuitry. The motor control circuitry passes alternating three phase signals derived from Direct Current (DC) sources. These signals are generated in such manner that a constant three phase (Y type) magnetic field may be realized to generate rotating movement of the rotating plate. This rotation is transferred to an axle wheel to form a Direct Current (DC) brushless alternative auxiliary motor structure which avoids brush damage and circuitry damage typically caused with prior art brush motor structures. Thus, the complexity associated with prior art DC motor structures is eliminated.

Another object of the present invention is to provide an auxiliary motor wherein the motor's stationary external case and a cover member secured to the bicycle drive wheel are respectively fitted with speedometer sensor components which cooperatively sense the bicycle speed. These signals are compared by the operational program of the control circuitry to a threshold speed to automatically actuate the three phase DC motor to propel the vehicle on the road when the sensed speed exceeds the threshold speed. Where the sensed speed does not exceed the threshold speed, automatic actuation does not occur; however, the motor may be manually actuated via an accelerator (like the handle throttle on a motorcycle) to control the power output. Thus, the present invention allows the operator to directly control the power, torque, and speed generated by the auxiliary motor. The vehicle could then be manipulated by the driver to adapt to a wide range of driving conditions. This enhances the vehicle's safety and performance.

BRIEF DESCRIPTION OF THE DRAWINGS

The details of the present invention are described in light of the following Figures.

DETAILED DESCRIPTION OF THE INVENTION

Figure 1:
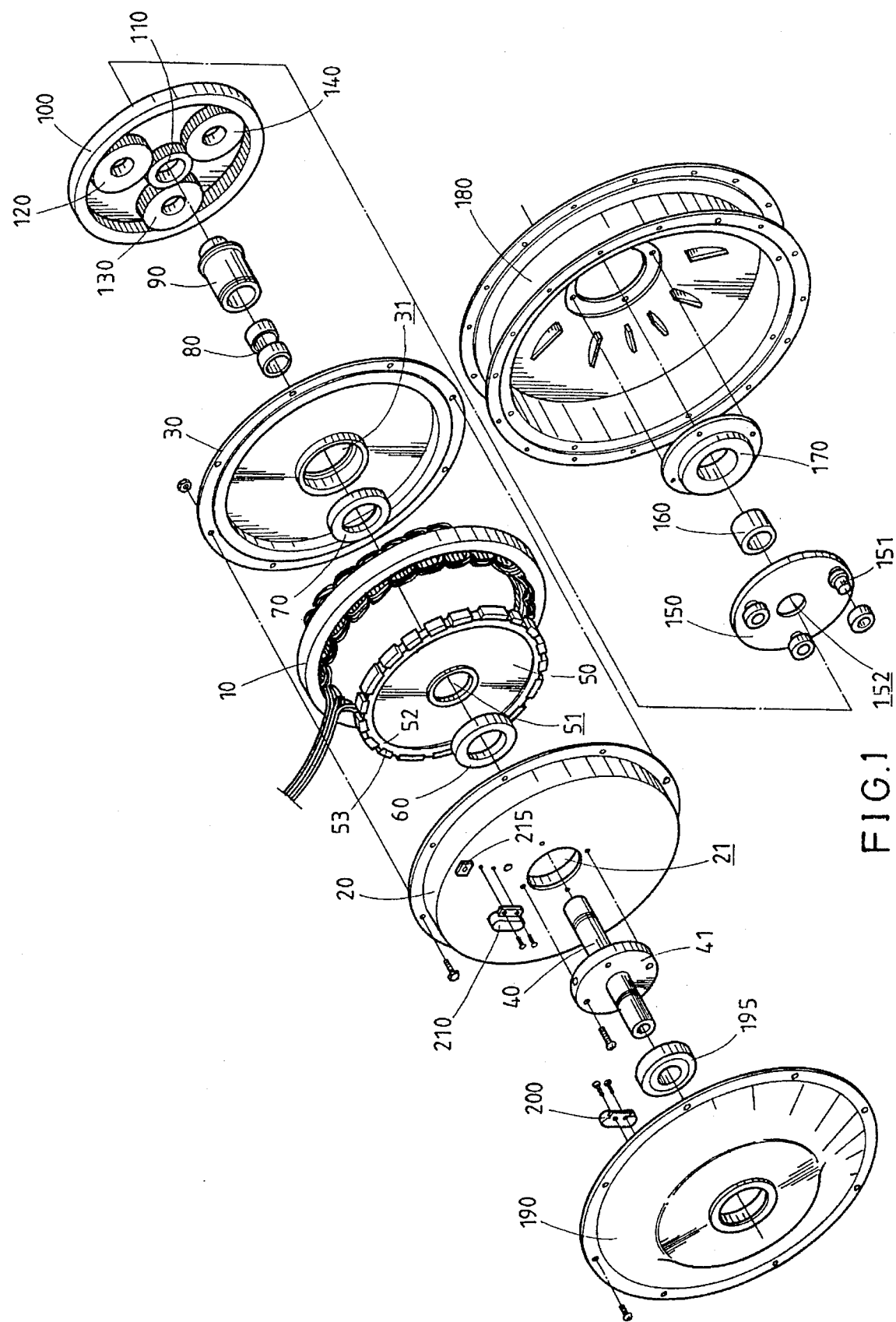
FIG. 1 is an exploded perspective view of the preferred embodiment of the Auxiliary Magnetic Motor of the present invention.
Figure 2:
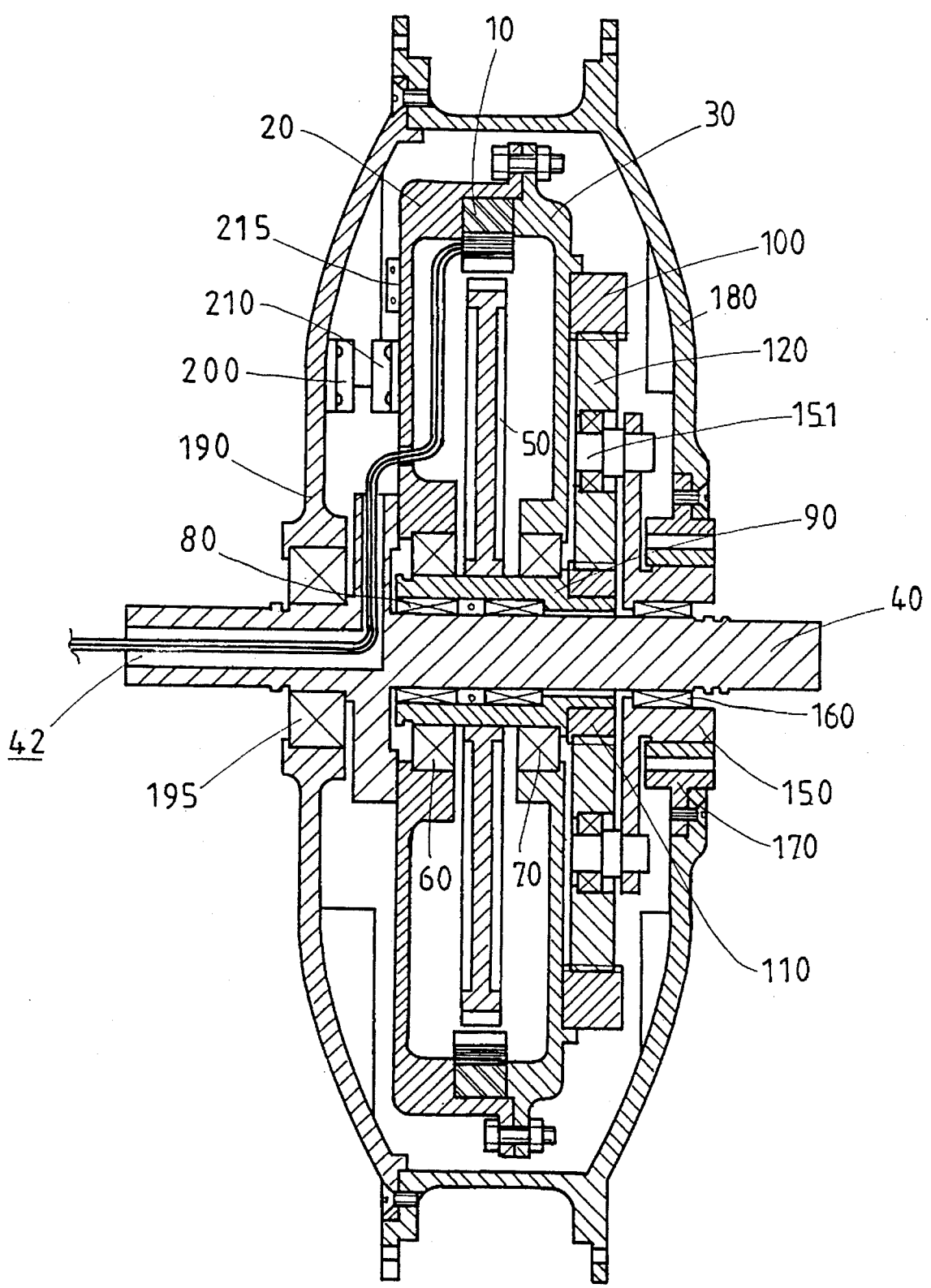
FIG. 2 is a cross-sectional view of the preferred embodiment of the present invention.
Figure 3:
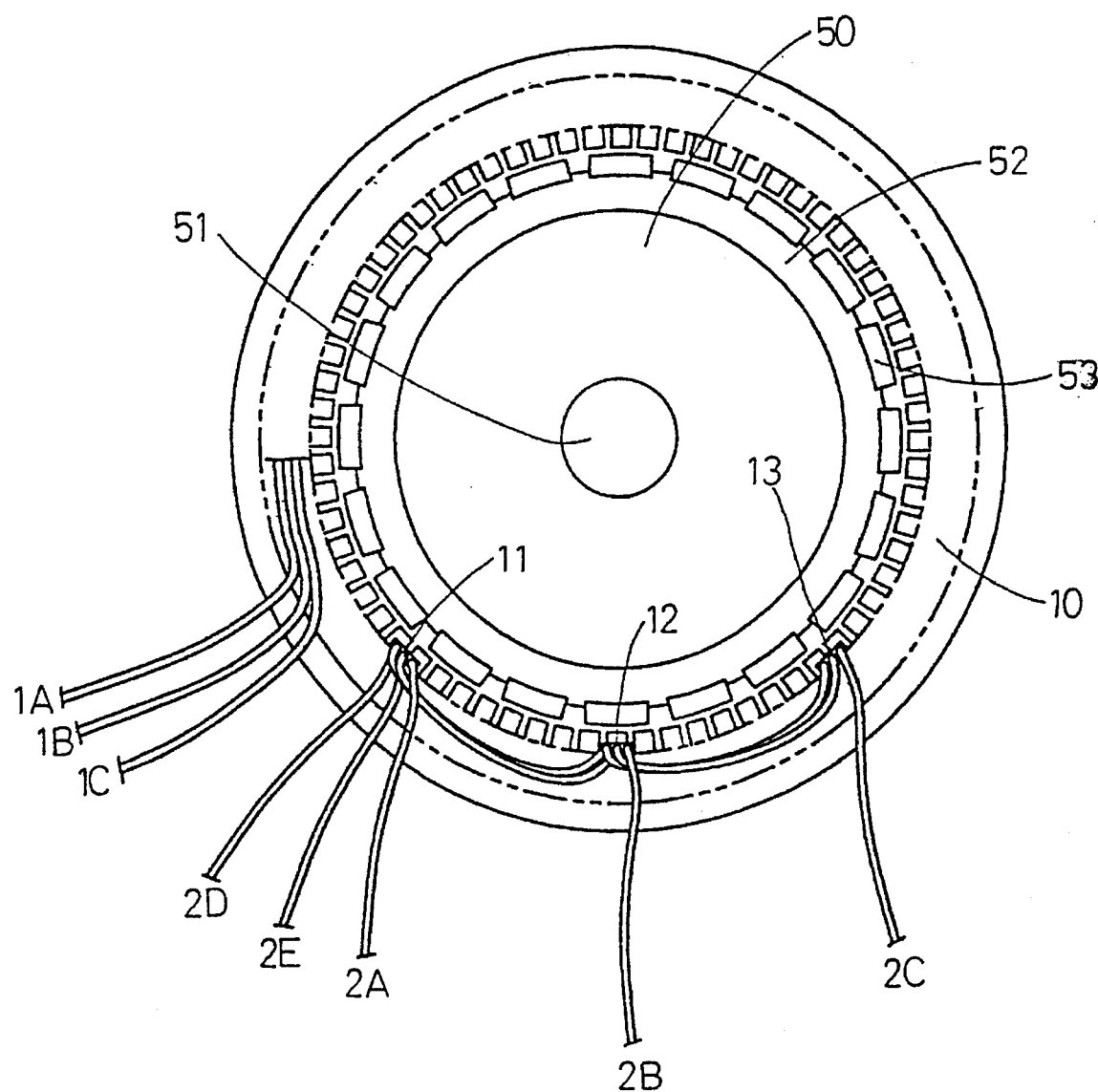
FIG. 3 is a sectional view of the preferred embodiment of the present invention.

Referring now to FIG. 1–FIG. 3, the AMM of the present invention comprises a fixed ring 10 having a plurality of flat teeth-like formations of preferably a silicon steel material composition. The fixed ring 10 has wound about its teeth-like formations coiled three-phase star-like (Y type) conductors. The three phase conductors respectively lead to signal line sources 1A, 1B, and 1C (shown in FIG. 3). The ring 10 has positioned thereon Hall effect ICs 11, 12, 13 which provide the signals necessary for three phase angle balancing signal circuitry operation. The Hall effect ICs are connected to the signal lines 2A, 2B, 2C and the power cords 2D, 2E. These Hall effect ICs 11–13 detect the magnetic field parameters necessary to determine the relative angles between the fixed ring 10 and a rotating plate 50 to be described in following paragraphs. The sources 1A, 1B, 1C of the fixed ring 10 generate the necessary coil switching signals to actuate the resulting brushless electronic switching structure.

The fixed ring 10 is captured between flat motor case plates 20, 30. The case plates 20, 30 have respectively formed therethrough internal holes 21, 31, and an axle 40 is inserted therethrough. A composite plate 41 extends radially from axle 40. Composite plate 41 is secured to an outer face of cover plate 20 to retain axle 40 within the sleeve hole 21 of the case 20. On the side of the composite plate 41 opposing axle 40 projects a hollow formation which forms an access conduit, or a wire hole 42, for the passage therethrough of conductive lines from sources 1A–1C, signal switching lines 2A–2C, power cords 2D–2E, as well as any other signal wires to be connected to the motor assembly.

A rotating plate 50 is concentrically disposed within the fixed ring 10. Rotating plate 50 has formed at its center an axle hole 51 and has formed at its circumferential periphery a cast iron ring 52. The cast iron ring 52 has coupled about its outer surface a plurality of magnetic iron blocks 53 which, in operation, form a rotating permanent magnet structure. The axle hole 51 of rotating plate 50 is defined by a raised collar portion which receives thereabout axle members 60, 70. Axle hole 51 coaxially receives therein a hollow shaft 90 fitted about a bearing seat 80. The resulting assembly is coaxially coupled to the axle 40. With this configuration, a predetermined air gap is maintained between the magnetic blocks 53 and the coiled conductors of the fixed ring 10 to form an inductive motor structure.

A gear box 100 may be of any suitable gear assembly construction type. Preferably, though, it is of a planetary gear assembly type. The hollow axle 90 matingly engages with the central solar gear 110 of the gear assembly 100 to form a deceleration linkage therewith. Thus, the inductively-generated rotation of the rotating plate 50 is mechanically coupled to and drives the solar gear 110. The gear linkages 120, 130, and 140 of the gear assembly 100 are mounted by common shafts so as to be coupled to peripheral counterparts 151 of a pulley plate 150. This allows linkages 120, 130, 140 of gear assembly 100 to cooperatively transfer to pulley plate 150 a rotation driven by rotating plate 50. The pulley plate 150 is formed with an assembly hole 152 at its center to receive therein a suite 160 coaxially coupled to the axle 40 and connecting to a clutch 170. The rotation of pulley plate 150 thereby drives the clutch 170 which is connected to the interior of a plate case 180. The plate case 180 which is fixedly coupled to the bicycle wheel to be driven is, thus, inductively driven by the rotation plate 50, the plate case 180 and case cover 190 being fastened together to enclose the motor assembly and being rotatable about the axle 40 axially passing therethrough.

Figure 4:
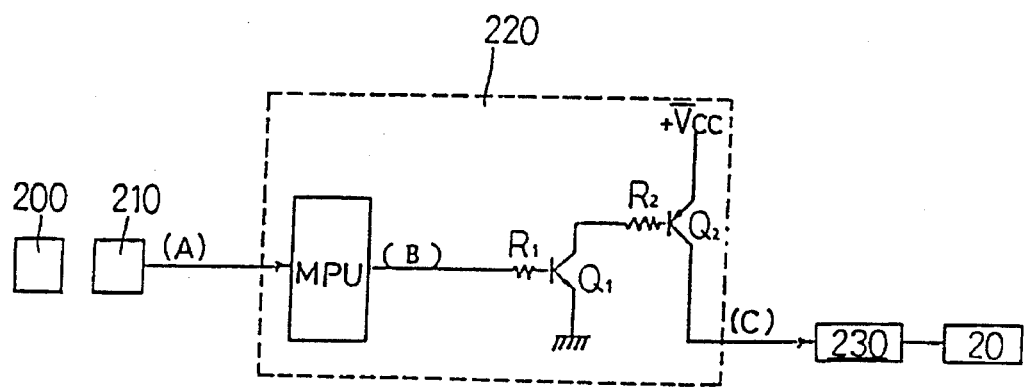
FIG. 4 is a schematic diagram of the preferred embodiment of the control circuitry of the present invention.
Figure 5:
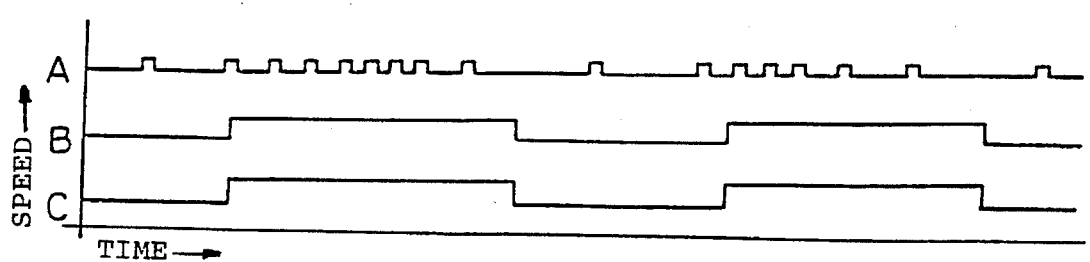
FIG. 5 is a timing diagram for the control circuitry shown in FIG. 4.

Respectively on the inner side of the case cover 190 and on the case plate 20 are a pair of speed sensors 200, 210 which cooperate to measure the rotation of cover 190 relative to the stationary case plate 20. These speed sensors 200, 210 are preferably magnetic spring switches. These sensors 200, 210 are connected by conductors (not shown) to control circuitry 220 (as shown in FIG. 4). At least one thermo-controlled switch 215 is placed on motor case plate 20 to sense the temperature of the motor assembly, such that overheat conditions may be prevented by automatically shutting off the motor when a predetermined temperature is sensed.

Referring now to FIG. 4, there is shown a schematic diagram of the control circuitry 220 which is coupled to the various sensors (optional sensor 215 not shown) and to the motor control circuitry 230. The control circuitry 220 generally comprises a speedometer unit MPU which receives the relative rotation rate signal fed by one of the speed sensors 200, 210 through terminal A and performs the necessary conversions to generate the bicycle speed. Preferably in the present invention, if the bicycle speed thus measured is greater than 8 km/hr, the output of the speedometer MPU at point B is a high voltage signal through resistor R1 which turns on switching device Q1. This ties resistor R2 to ground, turning on the switching device Q2 to tie the high voltage $V_{cc}$ to output point C.

The motor control circuitry 230 includes the necessary mechanisms to convert the input DC signal to an effective alternating three-phase signal to be provided through sources 1A–1C. The motor control circuitry 230 is coupled also to switching signals 2A–2C, power cords 2D–2E, and thermo-controlled switch 215. The motor control circuitry 230 thus offers a three-phase signal derived from a direct current input (DC) signal to the fixed ring 10, so as to drive the rotation plate 50 which, in turn, drives the case cover 180. The switching signal lines 2A–2C will simultaneously feed back sequence signals to the motor control circuitry 230. If the bicycle speed is lower than or equal to 6 km/hr, the speedometer will generate a low-end voltage MPU output, responsive to which the circuitry 230 will assume a closed state. The rotation plate 50 will then not be driven. When the thermo-controlled switch 215 detects overheating conditions during motor operation, the circuitry 230 is automatically placed in its closed state.

Figure 6:
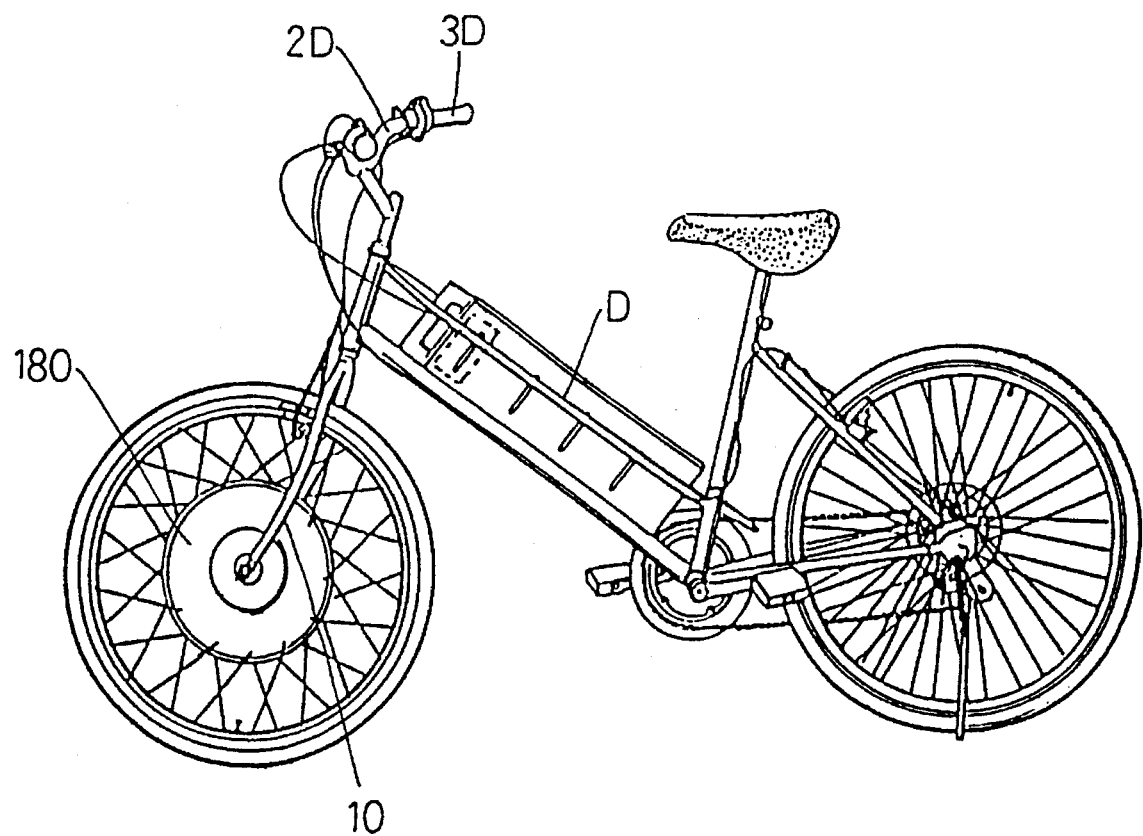
FIG. 6 is an elevational view of a typical application of the preferred embodiment of the present invention.

Referring now to FIG. 6, there is shown a preferred implementation of the preferred embodiment of the auxiliary magnetic motor of the present invention. The actual implementation chosen will depend on the user's preference and on such considerations as road conditions and whether one or two (front and/or rear) wheels are to be driven by the auxiliary magnetic motor. The auxiliary magnetic motor in the implementation shown is connected between the external case 180 and the inner portion of the front wheel by use of steel wire or plate, and is bolt-locked on the front axle 1D through the two ends of the front wheel axle 40. The control circuitry 220 and motor control circuitry 230 are mounted to appropriate portions of the bicycle frame D, and the power is supplied by a battery or direct current battery assembly.

Another feature is the rotating handle 3D placed on the two ends of the steering handler 2D of the bicycle for manual actuation of the motor at bicycle speeds of up to 8 km/hr. As the rotating handle 3D is rotated, the power output, torque, and speed are responsively varied. This allows the driver to handle the bicycle at will.

The present invention offers an improved motor system which reduces or eliminates the drawbacks seen in prior art motorized bicycles. While the present invention adopts Hall effect ICs 11–13 for sequenced switching detection, feedback control circuitry may be incorporated into motor control circuitry 230 to detect the angular displacement of the rotation plate 50 to provide the necessary switching sequence for proper motor operation. The auxiliary magnetic motor of the present invention is an effective AMM propulsion system assembly for upgrading manually-propelled vehicles and thereby enhancing the effectiveness and utility of that vehicle.

What is claimed is:

1. A brushless motor system for automatically propelling a bicycle having a drive wheel, comprising:

an axle member extending in a longitudinal direction;

a rotating plate mounted within said drive wheel of said bicycle, said rotating plate having a substantially planar contour peripherally defined by an outer ring portion, said rotating plate being coaxially rotatively coupled to said axle member, said outer ring portion having a plurality of magnetic members formed thereon;

a fixed ring coupled in fixed relation to said axle, said fixed ring being concentrically disposed about said rotating plate, said fixed ring having an inner portion, said inner portion having formed thereon a plurality of conductive windings, said conductive windings being disposed in spaced relation to said rotating plate magnetic members of said rotating plate;

motor control means coupled to said fixed ring for generating a signal for energizing said conductive windings of said fixed ring for magnetically actuating said rotation of said rotating plate about said longitudinal direction;

control means coupled to said motor control means for controlling said motor control means;

at least three Hall effect devices coupled to said fixed ring for sensing the angular position of said rotating plate relative to said fixed ring;

a motor case assembly fixedly coupled to said axle for supporting said fixed ring;

a gear mechanism coupled to said rotating plate to convert said rotation of said rotating plate to a driving torque for rotating said drive wheel of said bicycle;

a pulley plate coupled to said gear mechanism;

a clutch disposed adjacent said pulley plate for operatively engaging said pulley plate;

a plate case fixedly coupled to said drive wheel and said clutch; and, a plate cover coupled to said plate case for housing said motor case, said gear mechanism, said pulley plate and said clutch within said plate case.

2. The brushless motor system as recited in claim 1 further comprising a speed sensor means coupled to said control means for sensing rotational speed of said drive wheel of said bicycle, said speed sensor generating a speed-indicating signal for said control means.

3. The brushless motor system as recited in claim 2 wherein said speed sensor includes a first magnetic spring switch assembly coupled to an inner surface of said plate cover and a second magnetic spring switch assembly coupled to an outer surface of said motor case, said first and said second magnetic spring switch assemblies cooperatively measuring said rotational speed of said drive wheel.

4. The brushless motor system as recited in claim 3 wherein said control means includes a programmable speedometer for receiving said speed-indicating signals from said speed sensor means and for determining the linear speed of said bicycle therefrom, said control means actuating said motor control means to energize said conductive windings when said linear speed of said bicycle is above a first predetermined speed and to de-energize said conductive windings when said linear speed is below a second predetermined speed.

5. The brushless motor system as recited in claim 4 further comprising a heat sensor coupled to said control means for sensing said motor case temperature, said control means controlling said motor control means to de-energize said conductive elements when said motor case temperature is above a predetermined temperature.

6. The brushless motor system as recited in claim 1 wherein, said fixed ring conductive windings comprise coiled, three phase Y-type conductors.

7. The brushless motor system as recited in claim 6 wherein said motor control means outputs a plurality of signals for energizing said Y-type conductive elements, said plurality of signals being phase displaced relative to one another.

* * * * *